Figure 1:
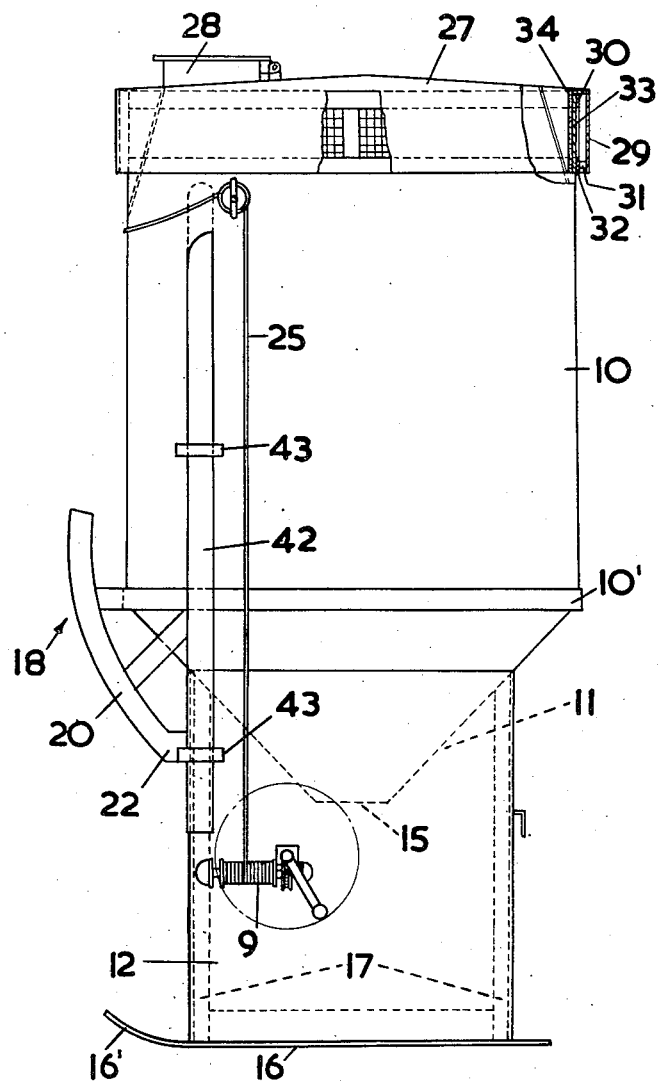

Oct. 1, 1957     S. A. GLENDINNING     2,808,164
TRANSPORTABLE BIN OR CONTAINER

Filed Jan. 19, 1956     3 Sheets-Sheet 1

INVENTOR
Stanley A. Glendinning

ATTORNEYS

Oct. 1, 1957 S. A. GLENDINNING 2,808,164
TRANSPORTABLE BIN OR CONTAINER
Filed Jan. 19, 1956 3 Sheets-Sheet 2
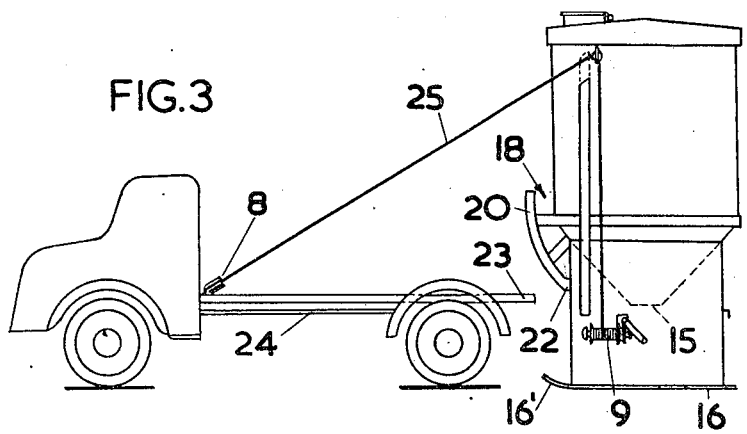
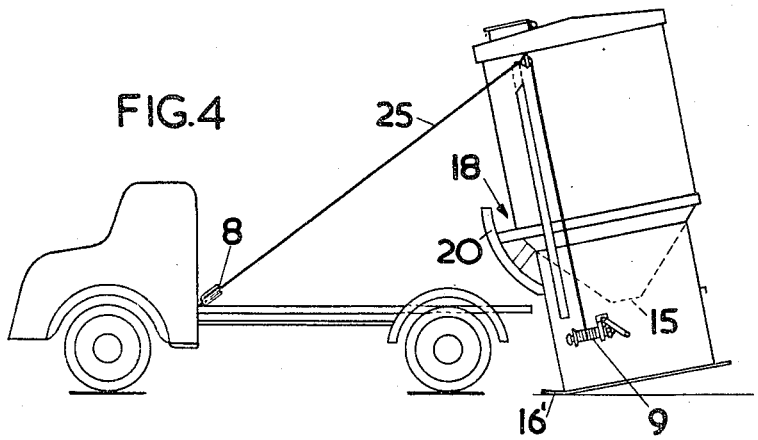
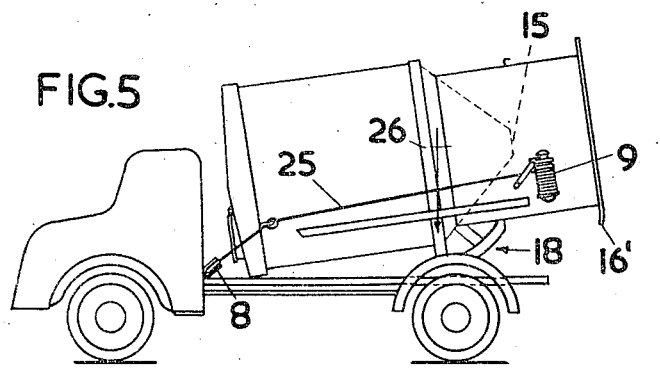
INVENTOR
Stanley A. Glendinning
By Holcomb, Wetherill & Brisebois
ATTORNEYS

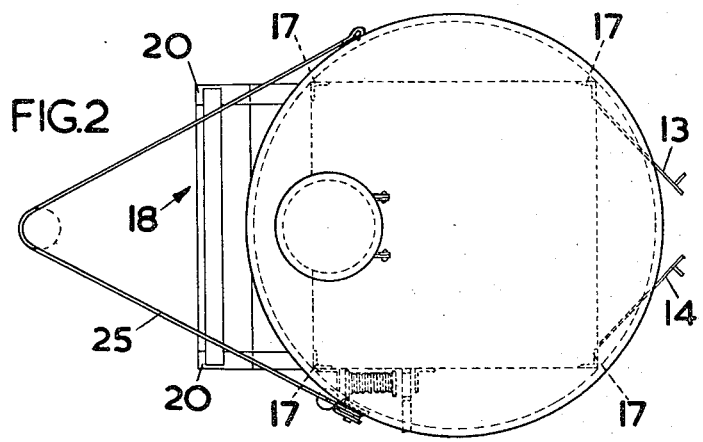
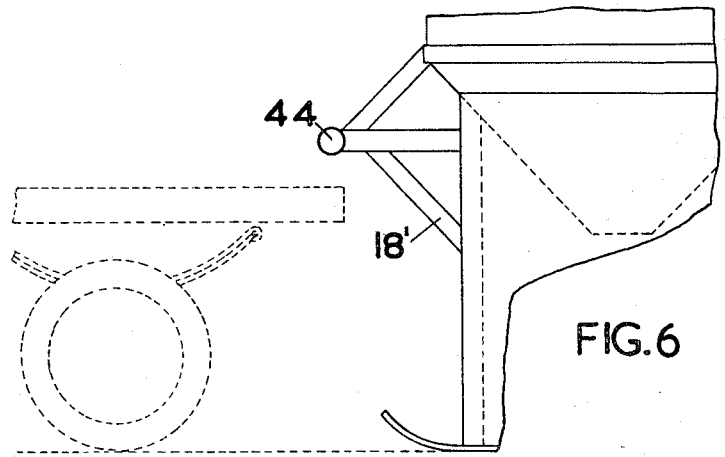
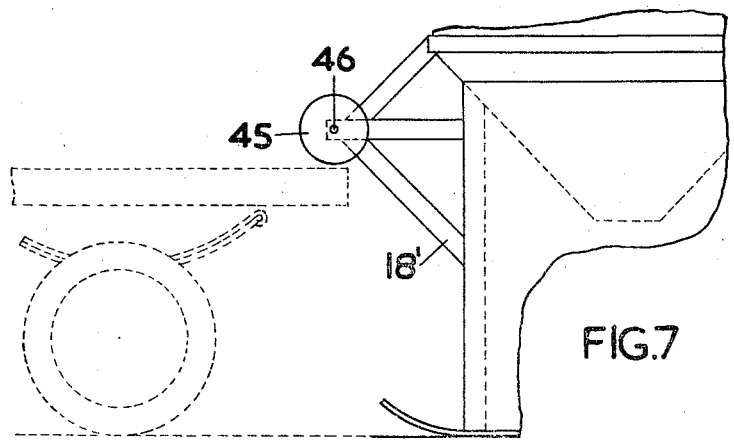

United States Patent Office 2,808,164
Patented Oct. 1, 1957

2,808,164

TRANSPORTABLE BIN OR CONTAINER

Stanley A. Glendinning, Bromley, England, assignor to Amalgamated Limestone Corporation Limited, London, England, a British company Application January 19, 1956, Serial No. 560,243

14 Claims. (Cl. 214—517)

This invention relates to a bin or container (hereinafter referred to as a "container") for the storage of powdered materials, such as cement, in bulk.

The object of the invention is to provide a transportable container of substantial capacity which can be readily loaded on to, and unloaded from, a transport vehicle with a minimum amount of labour, and which can thus provide a storage container which can be readily moved from one site to another.

With the foregoing object in view a container made in accordance with the present invention is fitted on its side and intermediate its ends with a projection adapted, when the container is being loaded on to, or unloaded from, a transporting vehicle, to bear on the floor or the like of the vehicle, whereby the loading and unloading of the container can be facilitated by rocking the container around the projection, said projection being located on the container so that when the container is loaded on a transporting vehicle it is unbalanced and tends to rock off the vehicle into an end-on position.

The tendency of the container to rock off the vehicle may be restrained by a hand tackle fitted between the container and the floor of the transporting vehicle, the hand tackle being utilised to control the unloading of the container, and to tilt the container on to the vehicle when the latter is subsequently again loaded on to the vehicle.

The projection may be formed with a rolling surface, and may be fitted to the wall of the container after the latter has been made, or it may be formed integral with the wall of the container.

In the accompanying drawings which illustrate how the invention may be carried into effect:

Fig. 1 is an elevation and Fig. 2 a plan view of a container made in accordance with the invention.

Figs. 3, 4 and 5 are views illustrating how the container shown in Figs. 1 and 2 can be loaded on to a transporting road vehicle, and Figs. 6 and 7 are detail views illustrating two modifications.

Referring first to Figs. 1 and 2 of the drawings the container shown in these figures comprises an upper cylindrical part 10 and a conical lower part 11, the latter being joined to the bottom of the part 10 and being enclosed in a depending framework 12 forming a bottom end support for the container. The framework 12 consists in the example shown of four angle irons 17 equiangularly spaced around the conical part 11 and closed in by thin metal sheet panels so as to form a hollow structure of rectangular cross-section. One of the side panels is apertured to provide access to a discharge outlet 15 formed at the lower end of the conical part, the aperture being normally closed by lock-up doors 13, 14 (see Fig. 2). The framework 12 is closed at bottom by a base plate 16, which projects outwards beyond the periphery of the skirt. The projecting edge 16' of the base plate is curved upwardly at one place for the purpose hereafter described.

A cam-like structure 18 is fixed to a reinforcing ring 10' at the base of the part 10 and to one adjacently disposed pair of the angle irons 17 so as to project from one side of the container, above the upwardly curved projecting edge 16' of the base plate 16. This cam-like structure 18 comprises an open rigid framework consisting of metal angle members suitably connected together and welded or otherwise secured on the inside to the angle irons 17 and formed on the outside with a pair of curved side rails 20. The structure 18 is located on the container so that its lower end 22 can, when desired, be substantially in line with the floor surface 23 of a transporting vehicle 24, which, as shown in Fig. 3, when the container is to be loaded thereon, is backed centrally against the container with the rear edge of the floor surface 23 immediately adjacent to the lower end 22 of the structure 18. Opposite sides of the container are each engaged near the top thereof by a tackle 25 which can be passed over a snatch block 8 secured to the floor of the vehicle 24 and which is adapted to be operated, when the container is to be loaded on to the vehicle 24 by a winch 9 or the like to tilt the container towards the vehicle floor (as shown in Fig. 4) to engage thereon the lower edge of the structure 18, the curved side rails 20 of which constitute a rolling surface which, on progressive operation of the winch, rolls on the vehicle floor to bring the container into the fully loaded position shown in Fig. 5. The initial tilting of the container is facilitated by the upwardly curved projecting edge 16' of the base plate 16 above described.

The rolling surface constituted by the side rails 20 is preferably designed to provide balance points such that when the container is being loaded on to a transporting vehicle (Fig. 4) it is unstable and tends to return to the fully unloaded position (Fig. 3) thereby placing the tackle 25 under tension and preventing overbalancing and sudden change of position. In this way the actual work done in loading the bin or container on to the vehicle need only be that necessary to overcome the unbalanced load. In the fully loaded position shown in Fig. 5 the container is mounted on the vehicle in a substantially horizontal position but tilted slightly downwardly in a forward direction, and the centre of gravity 26 is so located that the container is then in a substantially stable position but with a slight tendency to regain the upright position, the container being held against this tendency, under travelling conditions, by the tackle 25, and by wedges, ties or the like.

In order to unload the bin on a desired site any wedges, ties or the like used to secure the container on the vehicle during transport are removed or cast off, whereupon the container will then tend to roll off the vehicle; this tendency is, however, prevented by the tackle 25 which takes the strain and which is progressively eased off to control the rolling of the container off the vehicle. When the container has thus been removed from the vehicle it assumes the vertical position shown in Fig. 3. A weighing or measuring device (not shown) may be fitted to enable the discharged powder contents to be batched ready for use. When the container is required on another site it can again be readily loaded on to a transporting vehicle in the manner above described and transported to the new site.

The top of the container is closed by a cover 27 fitted with an inspection hatch 28 and formed with a depending flange surrounding the top of the container. The flange comprises a mild steel plate 29 welded to an annular angle iron 30 in turn welded to the periphery of the cover, the lower edge of the plate 29 being secured by spacing tubes 31 welded to a ring 32 welded around the top of the container. A 1" sq. heavy wire mesh 33 is fitted between the rings 30, 32 and is tack-welded at its top and bottom edges to these two members respectively. A porous layer 34 of latex foam rubber is securely fixed around the inner surface of the wire mesh 33 and provides a filter vent which can be made weather-proof by construction if desired. The container is loaded pneumatically by a pipe 42 which is fixed to the container and enters the latter below the ring 32 and is held against the container by clips 43. The pipe 42 can be readily connected to the supply by a flexible pipe (not shown). The porous layer 34 prevents escape of powder during charging.

In the embodiment above described the container has a capacity of about 10 tons, and is intended to provide for storage and a service point, e. g. alongside a concrete mixer. The overall length of the specific container above described, including the skirt and cover is approximately 14 ft. 9 ins. and the diameter of the upper part of the container and of the skirt is approximately 6 ft. 6 ins. These dimensions will of course vary according to requirements.

The construction shown in Figs. 1 and 2 of the drawings can be modified in many ways within the scope of the appended claims.

In the modification shown in Fig. 6 the curved side rails 20 are replaced by a cylindrical rod or tube 44 extending between the two supporting structures 18'. The rod or tube 44 constitutes a fulcrum about which the container is rocked when it is being loaded on to or unloaded from the vehicle 24.

In the modification shown in Fig. 7 the curved side rails 20 are replaced by two discs or wheels or rollers 45 mounted on an axle 46 carried between the two supporting structures 18'.

In all forms of the apparatus the wall of the upper part 10 of the container may be corrugated instead of being smooth, and the sides of the bottom end support 12 may be left open instead of being closed, the angle irons 17 then constituting legs on which the container is supported in the unloaded position.

It will be apparent that a container made in accordance wtih the invention can be readily unloaded from a transporting vehicle, by a single attendant, into any desired position on a site; and again loaded by a single attendant on to a transport vehicle for transport to another site, without danger to the attendant, who can remain clear of the container whenever it is in, or liable to be in, motion. The container can be readily charged with powder on the site, and the powder stored in the container can be readily discharged therefrom when required.

The invention provides a transportable container which is particularly suitable for supplying cement and like powders in bulk from a distributing tanker service.

What we claim and desire to secure by Letters Patent is:

1. A container for the storage of powdered materials provided with fixed means for supporting it in an elevated position on one end, said container being provided on one side with an external transversely elongated projection positioned between its other end and the transverse plane through the center of gravity thereof, and constituting, when said container is loaded on to the floor of a vehicle with said projection extending downwardly, a fulcrum bearing on the vehicle floor about which the empty container is unbalanced so that it tends to rock off the vehicle into an upright position on said first-mentioned end.

2. A container for the storage of powdered materials comprising a projection formed on the side and intermediate the ends of the container, said projection being so disposed that when the container is being loaded on to or unloaded from a transporting vehicle, it bears on the floor of the vehicle and enables the container to be rocked around the projection, thereby to facilitate the loading and unloading of the container, and so that when the container is loaded on a transporting vehicle with said projection bearing on the floor of the vehicle, said container is unbalanced and tends to rock off the vehicle in an end-on position, and further comprising a hand tackle fitted to said container and adapted to be connected to the floor of the transporting vehicle so as to be operable when said container is to be loaded on to the vehicle to tilt the container on to the vehicle, and to control the subsequent unloading of said container from said vehicle.

3. A container according to claim 1 in which said projection is formed with a rolling surface.

4. A container according to claim 1 in which said projection is made separately from the wall of said container.

5. A container for the storage of powdered materials comprising a projection formed on the side and intermediate the ends of the container, said projection being so disposed that when the container is being loaded on to or unloaded from a transporting vehicle, it bears on the floor of the vehicle and enables the container to be rocked around the projection, thereby to facilitate the loading and unloading of the container, and so that when the container is loaded on a transporting vehicle with said projection bearing on the floor of the vehicle, said container is unbalanced and tends to rock off the vehicle in an end-on position, and further comprising a body portion, a cover therefor, means for pneumatically charging the container with powdered material, and filter means disposed between said body portion and said cover to prevent escape of powdered material when charging said container.

6. A container according to claim 1 comprising a body portion having a tapered lower end part formed with a discharge outlet, and a supporting structure fixed to said container so as to depend below said tapered lower end part.

7. A container for the storage of powdered materials comprising a projection formed on the side and intermediate the ends of the container, said projection being so disposed that when the container is being loaded on to or unloaded from a transporting vehicle, it bears on the floor of the vehicle and enables the container to be rocked around the projection, thereby to facilitate the loading and unloading of the container, and so that when the container is loaded on a transporting vehicle with said projection bearing on the floor of the vehicle, said container is unbalanced and tends to rock off the vehicle in an end-on position and further comprising a cylindrical body portion having a tapered lower end part formed with a discharge outlet, a reinforcing ring secured to the wall of the cylindrical body portion at the lower end thereof, said projection being fixed to said reinforcing ring.

8. A container for the storage of powdered materials comprising a projection formed on the side and intermediate the ends of the container, said projection being so disposed that when the container is being loaded on to or unloaded from a transporting vehicle, it bears on the floor of the vehicle and enables the container to be rocked around the projection, thereby to facilitate the loading and unloading of the container, and so that when the container is loaded on a transporting vehicle with said projection bearing on the floor of the vehicle, said container is unbalanced and tends to rock off the vehicle in an end-on position, and further comprising a cylindrical body portion having a tapered lower end part formed with a discharge outlet, a reinforcing ring secured to the wall of the cylindrical body portion at the lower end thereof, said projection comprising a rigid framework fixed to said reinforcing ring and curved side rails fixed to said rigid framework, said side rails constituting a rolling surface on said projection.

9. A container for the storage of powdered materials comprising a projection formed on the side and intermediate the ends of the container, said projection being so disposed that when the container is being loaded on to or unloaded from a transporting vehicle, it bears on the floor of the vehicle and enables the container to be rocked around the projection, thereby to facilitate the loading and unloading of the container, and so that when the container is loaded on a transporting vehicle with said projection bearing on the floor of the vehicle, said container is unbalanced and tends to rock off the vehicle in an end-on position, and further comprising a cylindrical body portion having a tapered lower end part formed with a discharge outlet, a supporting structure fixed to said cylindrical body portion so as to surround said tapered lower end part and depend below said discharge outlet, a reinforcing ring secured to the wall of said cylindrical body portion at the lower end thereof, said projection comprising a rigid framework fixed to said reinforcing ring and to said supporting structure, and curved side rails fixed to said rigid framework so as to constitute a rolling surface on said projection.

10. A container according to claim 1 in which said projection comprises a rod of circular cross section and a rigid framework, fixed to the container, said rod being mounted on, so as to project beyond, said framework.

11. A container according to claim 1 in which said projection comprises a cylindrical tube and a rigid framework fixed to the container, said tube being mounted on, so as to project beyond, said framework.

12. A container according to claim 1 in which said projection comprises at least one rolling member and a rigid framework fixed to the container, said rolling member being rotatably mounted on, so that its periphery projects beyond said rigid framework.

13. A container for the storage of powdered materials comprising a projection formed on the side and intermediate the ends of the container, said projection being so disposed that when the container is being loaded on to or unloaded from a transporting vehicle, it bears on the floor of the vehicle and enables the container to be rocked around the projection, thereby to facilitate the loading and unloading of the container, and so that when the container is loaded on a transporting vehicle with said projection bearing on the floor of the vehicle, said container is unbalanced and tends to rock off the vehicle in an end-on position, and further comprising a base plate fixed to, so as to project from, the wall of the container below said projection, the projecting part of said base plate being upwardly curved for the purpose described.

14. A container as claimed in claim 1 provided with a cover, means through which the container may be pneumatically charged with powdered material, and filter means beneath said cover to prevent escape of powder when said container is being charged.

References Cited in the file of this patent

UNITED STATES PATENTS

| | | |
|---|---|---|
| 1,465,665 | Grindle | Aug. 21, 1923 |
| 1,794,714 | Kiplinger | Mar. 3, 1931 |
| 2,189,052 | Anthony | Feb. 6, 1940 |
| 2,233,005 | Garlinghouse | Feb. 25, 1941 |
| 2,519,153 | Roura | Aug. 15, 1950 |
| 2,606,676 | Dempster | Aug' 12, 1952 |
| 2,668,630 | Ertl | Feb. 9, 1954 |